United States Patent
Wei et al.

(10) Patent No.: US 11,794,682 B2
(45) Date of Patent: Oct. 24, 2023

(54) CURTAIN AIRBAG FOR VEHICLE

(71) Applicant: Autoliv Development AB, Vargarda (SE)

(72) Inventors: Liyan Wei, Shanghai (CN); Enwei Jin, Shanghai (CN)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/757,994

(22) PCT Filed: Dec. 25, 2020

(86) PCT No.: PCT/CN2020/139431
§ 371 (c)(1),
(2) Date: Jun. 24, 2022

(87) PCT Pub. No.: WO2021/136090
PCT Pub. Date: Jul. 8, 2021

(65) Prior Publication Data
US 2023/0059221 A1 Feb. 23, 2023

(30) Foreign Application Priority Data
Dec. 31, 2019 (CN) .......................... 201922470948.4

(51) Int. Cl.
*B60R 21/213* (2011.01)
*B60R 21/231* (2011.01)
(Continued)

(52) U.S. Cl.
CPC .......... *B60R 21/213* (2013.01); *B60R 21/232* (2013.01); *B60R 21/237* (2013.01); *B60R 21/23138* (2013.01)

(58) Field of Classification Search
CPC ................ B60R 21/232; B60R 21/213; B60R 21/23138; B60R 21/237
See application file for complete search history.

(56) References Cited

U.S. PATENT DOCUMENTS 7,125,038 B2   10/2006   Gammill
9,616,840 B2 *  4/2017   Arellano ............... B60R 21/201
(Continued)

FOREIGN PATENT DOCUMENTS

CN   109533090 A    3/2019
CN   211765401 U   10/2020
(Continued)

OTHER PUBLICATIONS

Park S, KR 100787671 B1, Machine Translation of Specification (Year: 2006).*
(Continued)

*Primary Examiner* — Drew J Brown
*Assistant Examiner* — Matthew Joseph Ganci
(74) *Attorney, Agent, or Firm* — Harness, Dickey & Pierce, P.L.C.; Stephen T. Olson

(57) ABSTRACT

A curtain airbag for a vehicle comprising: an airbag main body, an air chamber defined by the airbag main body; and a strip-shaped component, abutting the airbag main body. The strip-shaped component is electrically conductive, and is configured to deform or break when the airbag main body is twisted so that resistance of the strip-shaped component changes.

9 Claims, 4 Drawing Sheets

(51) Int. Cl.
 *B60R 21/232* (2011.01)
 *B60R 21/237* (2006.01)

(56) References Cited

U.S. PATENT DOCUMENTS

| | | | |
|---|---|---|---|
| 2007/0090630 A1* | 4/2007 | Wilmot | B60R 21/237 |
| | | | 280/730.2 |
| 2007/0228703 A1* | 10/2007 | Breed | B60R 21/20 |
| | | | 280/740 |
| 2008/0243342 A1* | 10/2008 | Breed | B60R 21/232 |
| | | | 280/730.2 |
| 2013/0113192 A1* | 5/2013 | Richards | B60R 21/232 |
| | | | 280/730.2 |
| 2014/0099016 A1* | 4/2014 | Adams | B60R 21/23 |
| | | | 382/141 |
| 2016/0264089 A1 | 9/2016 | Adams et al. | |
| 2019/0001912 A1* | 1/2019 | Sato | B60R 21/237 |

FOREIGN PATENT DOCUMENTS

| | | | | | |
|---|---|---|---|---|---|
| JP | 2004224255 A | | 8/2004 | | |
| JP | 2006117112 A | | 5/2006 | | |
| JP | 2006151277 A | | 6/2006 | | |
| JP | 2014180925 A | | 9/2014 | | |
| KR | 100787671 B1 | * | 12/2006 | | B60R 21/213 |
| KR | 20190100764 A | * | 2/2018 | | B60R 21/2338 |
| WO | WO-2012060573 A2 | * | 5/2012 | | B60R 21/213 |
| WO | WO-2014129054 A1 | * | 8/2014 | | B60R 21/201 |
| WO | 2015015674 A1 | | 2/2015 | | |

OTHER PUBLICATIONS

Eun H, KR 20190100764 A, Machine Translation of Specification (Year: 2018).*
Bok L S, WO-2012060573-A2, Machine Translation of Specification (Year: 2012).*
Fukuda T, WO-2014129054-A1, Machine Translation of Specification (Year: 2014).*
Ishikawa S, JP-2006151277-A, Machine Translation of Specification (Year: 2006).*
Japanese Office Action regarding Patent Application No. 2022531465, dated Jun. 15, 2023.

* cited by examiner

CURTAIN AIRBAG FOR VEHICLE

TECHNICAL FIELD

The present invention relates to a curtain airbag for a vehicle.

BACKGROUND

A curtain airbag is mounted on a roof of a motor vehicle. When deployed, the curtain airbag abuts a side window of the vehicle to protect the head of an occupant during a side impact or rollover accident. When stowed, the curtain airbag can be rolled and/or folded into an elongated shape. However, the elongated curtain airbag is prone to twisting such that, on the one hand, it is difficult to align the elongated curtain airbag with a mounting portion of the vehicle, and on the other hand, deployment of the curtain airbag may be affected.

It is known that a marking line extending in a lengthwise direction of the curtain airbag is provided on the curtain airbag to determine whether the curtain airbag is twisted. If it is observed that the marking line curves, then it is determined that the curtain airbag is twisted. However, this largely depends on human visual determination, and thus results in the occurrence of missed detection.

Therefore, it is necessary to provide a curtain airbag that allows for reliable determination of whether the curtain airbag is twisted.

SUMMARY

The present invention provides a curtain airbag that allows for reliable determination of whether the curtain airbag is twisted.

The present invention provides a curtain airbag for a vehicle, the curtain airbag comprising: an airbag main body, the airbag main body defining an air chamber; and a strip-shaped component, abutting the airbag main body, wherein the strip-shaped component is electrically conductive, and is configured to deform or break when the airbag main body is twisted so that resistance of the strip-shaped component changes.

According to an embodiment of the present invention, the airbag main body can be rolled and/or folded to have an elongated shape extending in a lengthwise direction of the airbag main body, and the strip-shaped component extends in the lengthwise direction of the airbag main body.

According to an embodiment of the present invention, the strip-shaped component is provided with multiple slits spaced apart from each other.

According to an embodiment of the present invention, the strip-shaped component has a first side edge and a second side edge opposite each other and extending in the lengthwise direction of the airbag main body, and the multiple slits comprise: multiple first slits extending inwards from the first side edge in a widthwise direction of the strip-shaped component; and multiple second slits extending inwards from the second side edge in the widthwise direction of the strip-shaped component, wherein the first slits and the second slits are arranged alternately in sequence in the lengthwise direction of the airbag main body.

According to an embodiment of the present invention, the strip-shaped component is located in an appropriate position on an outer surface of the elongated airbag main body, so that the resistance of the strip-shaped component is easily measured when the airbag main body is mounted on the vehicle.

According to an embodiment of the present invention, the strip-shaped component extends along an entire length of the airbag main body.

According to an embodiment of the present invention, the strip-shaped component is a metal, an electrically conductive macromolecular polymer, an electrically conductive film, or an electrically conductive non-woven fabric.

According to an embodiment of the present invention, the airbag main body comprises two airbag main pieces, and the two airbag main pieces are sewn together at an edge region, and seal the air chamber, wherein the strip-shaped component is fitted to the airbag main body by means of adhesion and/or sewing.

According to an embodiment of the present invention, the airbag main body is integrally formed, and the strip-shaped component is fitted to the airbag main body by means of bonding.

According to an embodiment of the present invention, if the airbag main body is twisted, then the strip-shaped component abutting the airbag main body deforms or even breaks. When the strip-shaped component deforms or breaks, the resistance of the strip-shaped component changes. Therefore, by measuring a change in the resistance of the strip-shaped component, it is possible to detect whether the airbag main body is twisted. In this way, twisting of the airbag main body can be reliably detected without any missed detection.

DETAILED DESCRIPTION

Exemplary embodiments of the present invention will be described in detail below with reference to the accompanying drawings.

Figure 1:
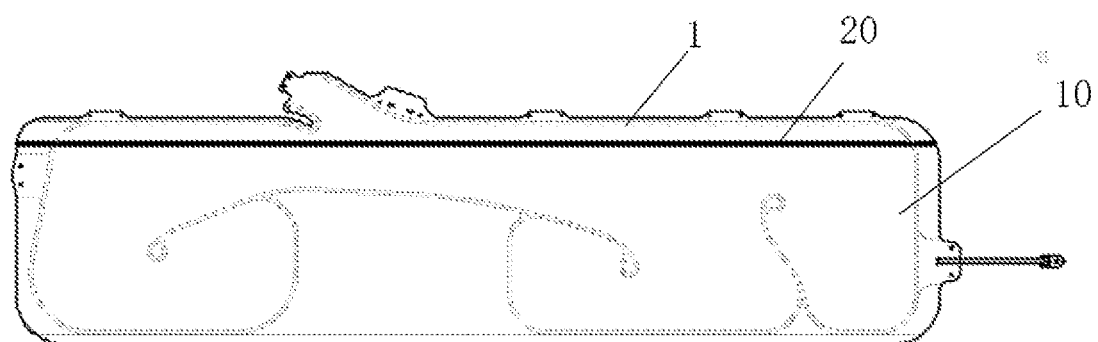
FIG. 1 is a plan view showing a curtain airbag for a vehicle according to an embodiment of the present invention.

FIG. 1 is a plan view showing a curtain airbag for a vehicle according to an embodiment of the present invention. As shown in FIG. 1, a curtain airbag 1 includes an airbag main body 10 and a strip-shaped component 20.

The airbag main body 10 is used to define an air chamber, and the air chamber can receive gas from a gas generator (not shown). The airbag main body 10 can be rolled and/or folded to have an elongated shape extending in a lengthwise direction of the airbag main body 10, so that the airbag main body 10 is in a stowed state. The airbag main body 10 in the stowed state can be mounted on a roof of the vehicle. The strip-shaped component 20 abuts the airbag main body 10, and is electrically conductive. The strip-shaped component 20 is configured to deform or break when the airbag main body 10 is twisted so that resistance of the strip-shaped component 20 changes.

A method for determining whether the curtain airbag 1 is twisted is described below. Firstly, when the airbag main body 10 is not rolled and/or folded, resistance R1 of the strip-shaped component 20 is measured. Then, after the airbag main body 10 is mounted on the roof of the vehicle, resistance R2 of the strip-shaped component 20 is measured. If R2 is greater than R1, then it is determined that the airbag main body 10 is twisted. If R2 is substantially equal to R1, then it is determined that the airbag main body 10 is not twisted.

If the airbag main body 10 is twisted, then the strip-shaped component 20 abutting the airbag main body 10 deforms or even breaks. When the strip-shaped component 20 deforms or breaks, the resistance of the strip-shaped component 20 changes. Specifically, when the strip-shaped component 20 deforms, the resistance thereof increases. When the strip-shaped component 20 breaks, the resistance thereof becomes infinitely great. Therefore, by measuring a change in the resistance of the strip-shaped component 20, it is possible to detect whether the airbag main body 10 is twisted. In this way, twisting of the airbag main body 10 can be reliably detected without any missed detection.

In this embodiment, the strip-shaped component 20 extends in the lengthwise direction of the airbag main body 10. However, it should be understood that the orientation of the strip-shaped component 20 is not limited thereto as long as the strip-shaped component 20 deforms or breaks when the airbag main body 10 is twisted. For example, the strip-shaped component 20 may extend obliquely in the lengthwise direction of the airbag main body 10.

Figure 2:
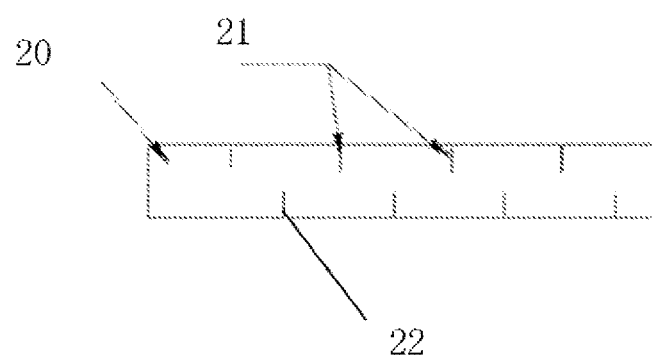
FIG. 2 is a partial enlarged view showing a strip-shaped component according to an embodiment of the present invention.

FIG. 2 is a partial enlarged view showing a strip-shaped component according to an embodiment of the present invention. FIG. 2 shows merely a portion of the strip-shaped component 20, and the other portions of the strip-shaped component 20 have the same structure as that of the portion shown in FIG. 2. As shown in FIG. 2, the strip-shaped component 20 is provided with multiple slits spaced apart from each other. In this case, when the airbag main body 10 is twisted, the strip-shaped component 20 is prone to break, and is not prone to fall off from the airbag main body 10.

In this embodiment, the strip-shaped component 20 has a first side edge and a second side edge opposite each other and extending in the lengthwise direction of the airbag main body 10. The strip-shaped component 20 has multiple first slits 21 and multiple second slits 22. The first slit 21 extends inwards from the first side edge in a widthwise direction of the strip-shaped component 20, and the second slit 22 extends inwards from the first side edge in the widthwise direction of the strip-shaped component 20. The first slits 21 and the second slits 22 are arranged alternately in sequence in the lengthwise direction of the airbag main body 10.

It should be understood that the arrangement of the first slit 21 and the second slit 22 is not limited thereto. For example, the first slit 21 and the second slit 22 may not split from the side edge of the strip-shaped component 20, but may split in the interior of the strip-shaped component 20. For example, the first slit 21 and the second slit 22 may also extend obliquely in the widthwise direction of the strip-shaped component 20.

In this embodiment, the multiple first slits 21 are arranged at equal intervals in the lengthwise direction of the airbag main body 10, and the multiple second slits 22 are arranged at equal intervals in the lengthwise direction of the airbag main body 10. A distance between two adjacent first slits 21 is equal to a distance between two adjacent second slits 22. Each second slit 22 is centrally located between two adjacent first slits 21.

In this embodiment, the multiple first slits 21 have the same length, and the multiple second slits 22 have the same length. In addition, the multiple first slits 21 and the multiple second slits 22 have the same length. The sum of the length of the first slit 21 and the length of the second slit 22 is less than a width of the strip-shaped component 20.

In this embodiment, the strip-shaped component 20 is located in an appropriate position on an outer surface of the elongated airbag main body 10, so that the resistance of the strip-shaped component 20 is easily measured when the airbag main body 10 is mounted on the vehicle. In this case, when the airbag main body 10 is mounted on the roof of the vehicle, a mounting personnel can easily access the strip-shaped component 20 so as to measure the resistance of the strip-shaped component 20. When the airbag main body 10 is inflated and deployed, one side surface of the airbag main body 10 faces a vehicle compartment, and the other side surface of the airbag main body 10 faces a vehicle window. The strip-shaped component 20 is generally arranged on a side of the airbag main body 10 facing the vehicle compartment.

In this embodiment, the strip-shaped component 20 extends along an entire length of the airbag main body 10. The strip-shaped component 20 may be a metal, an electrically conductive macromolecular polymer, an electrically conductive film, or an electrically conductive non-woven fabric. Alternatively, the strip-shaped component 20 may also be another material having resistance changing when the material deforms.

Figure 3:
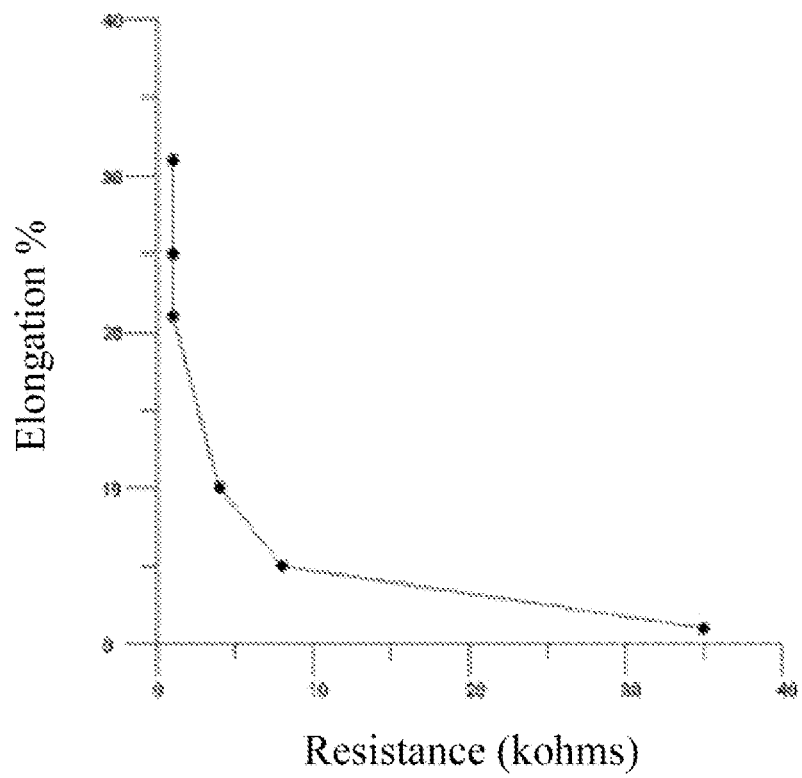
FIG. 3 is a schematic view showing a change in resistance of a deformed strip-shaped component having different elongations.

FIG. 3 is a schematic view showing a change in resistance of a deformed strip-shaped component 20 having different elongations. As shown in FIG. 3, a smaller elongation corresponds to a larger change in the resistance. The elongation of the strip-shaped component 20 is preferably small. In this case, when the airbag main body 10 is twisted, the strip-shaped component 20 is prone to break.

Figure 4A:
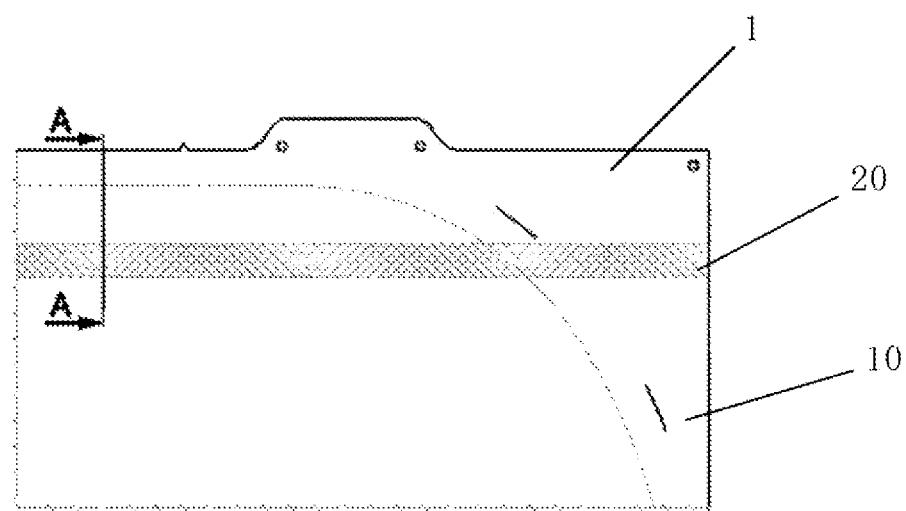
FIG. 4*a* is a partial enlarged view showing a curtain airbag according to an embodiment of the present invention.
Figure 4B:
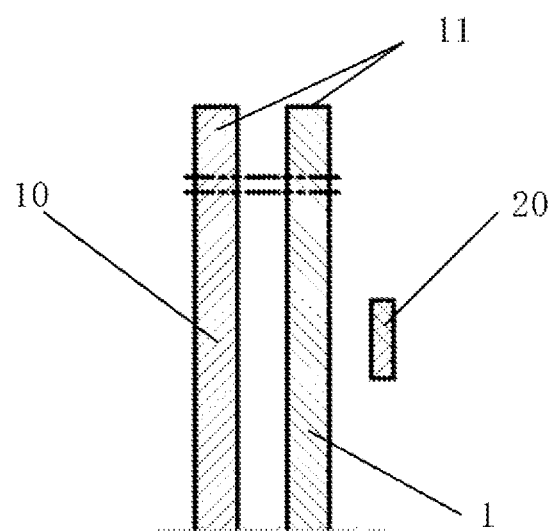
FIG. 4*b* is a partial cross-sectional view showing a curtain airbag according to one embodiment taken along line A-A in FIG. 4*a*.

FIG. 4a is a partial enlarged view showing a curtain airbag according to an embodiment of the present invention, and FIG. 4b is a cross-sectional view showing a curtain airbag according to one embodiment taken along line A-A in FIG. 4a. As shown in FIG. 4a and FIG. 4b, the airbag main body 10 includes two airbag main pieces 11. The two airbag main pieces 11 are sewn together at an edge region, and seal the air chamber. The strip-shaped component 20 is fitted to the airbag main body 10 by means of bonding.

Figure 4C:
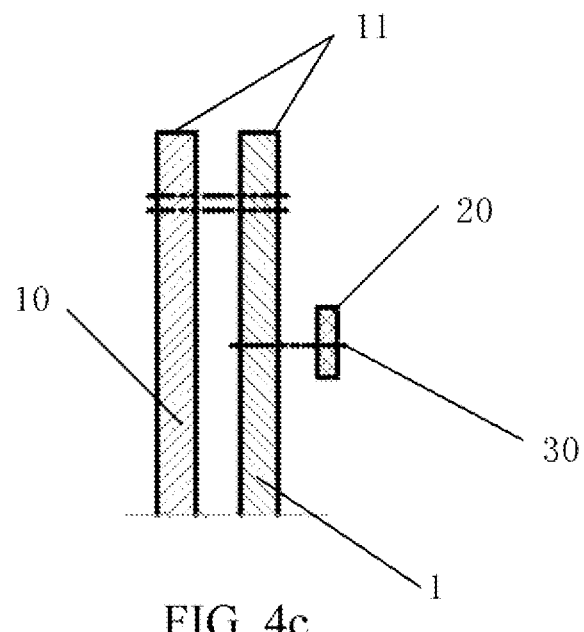
FIG. 4*c* is a partial cross-sectional view showing a curtain airbag according to another embodiment taken along line A-A in FIG. 4*a*.

FIG. 4c is a cross-sectional view showing a curtain airbag according to another embodiment taken along line A-A in FIG. 4a. As shown in FIG. 4c, firstly, the strip-shaped component 20 is bonded to the airbag main body 10, and then the strip-shaped component 20 and the airbag main body 10 are sewn together. In this way, when the airbag main body 10 is twisted, the strip-shaped component 20 is not prone to fall off from the airbag main body 10. In this example, a stitch 30 extends along an entire length of the strip-shaped component 20 in a direction parallel to the lengthwise direction of the strip-shaped component 20, and is arranged centrally on the strip-shaped component 20 in the widthwise direction of the strip-shaped component 20.

Figure 5:
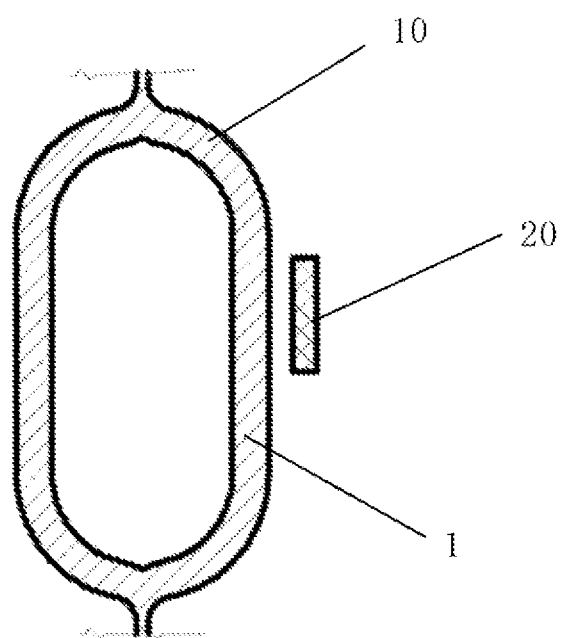
FIG. 5 is a cross-sectional view showing a curtain airbag according to yet another embodiment of the present invention.

FIG. 5 is a cross-sectional view showing a curtain airbag according to yet another embodiment of the present invention. As shown in FIG. 5, the airbag main body 10 is integrally formed, and the strip-shaped component 20 is fitted to the airbag main body 10 by means of bonding.

The above are merely the principle and preferred embodiments of the present invention. It should be pointed out that for those skilled in the art, on the basis of the principle of the present invention, multiple other variations may also be made, and this should also be construed as falling within the scope of protection of the present invention.

The invention claimed is:

1. A curtain airbag for a vehicle, comprising:
an airbag main body, the airbag main body defining an air chamber; and
a strip-shaped component, abutting the airbag main body, wherein the strip-shaped component is electrically conductive, and is configured to deform or break when the airbag main body is twisted so that resistance of the strip-shaped component changes.

2. The curtain airbag according to claim 1, wherein the airbag main body can be rolled and/or folded to have an elongated shape extending in a lengthwise direction of the airbag main body, and the strip-shaped component extends in the lengthwise direction of the airbag main body.

3. The curtain airbag according to claim 2, characterized in that the strip-shaped component is provided with multiple slits spaced apart from each other.

4. The curtain airbag according to claim 3, wherein the strip-shaped component has a first side edge and a second side edge opposite each other and extending in the lengthwise direction of the airbag main body, and the multiple slits comprise:

multiple first slits, extending inwards from the first side edge in a widthwise direction of the strip-shaped component; and
multiple second slits, extending inwards from the second side edge in the widthwise direction of the strip-shaped component, wherein the first slits and the second slits are arranged alternately in sequence in the lengthwise direction of the airbag main body.

5. The curtain airbag according to claim 4, wherein the strip-shaped component is located in an appropriate position on an outer surface of the elongated airbag main body, so that the resistance of the strip-shaped component is easily measured when the airbag main body is mounted on the vehicle.

6. The curtain airbag according to claim 5, wherein the strip-shaped component extends along an entire length of the airbag main body.

7. The curtain airbag according to claim 6, wherein the strip-shaped component is a metal, an electrically conductive macromolecular polymer, an electrically conductive film, or an electrically conductive non-woven fabric.

8. The curtain airbag according to claim 7, wherein the airbag main body comprises two airbag main pieces, and the two airbag main pieces are sewn together at an edge region, and seal the air chamber, wherein the strip-shaped component is fitted to the airbag main body by means of adhesion and/or sewing.

9. The curtain airbag according to claim 7, wherein the airbag main body is integrally formed, and the strip-shaped component is fitted to the airbag main body by means of bonding.

* * * * *